(12) United States Patent
Naudin et al.

(10) Patent No.: US 7,986,864 B2
(45) Date of Patent: Jul. 26, 2011

(54) MODULAR CABLE HEAD FOR OPTICAL NETWORKS

(75) Inventors: Thierry Naudin, Orvault (FR); Herve Brunet, St. Nazaire (FR); Michel Lambert, Sainte Marie do Redon (FR)

(73) Assignee: 3M Innovative Properties Company, St. Paul, MN (US)

( * ) Notice: Subject to any disclaimer, the term of this patent is extended or adjusted under 35 U.S.C. 154(b) by 1013 days.

(21) Appl. No.: 11/815,983

(22) PCT Filed: Feb. 15, 2006

(86) PCT No.: PCT/US2006/005282
§ 371 (c)(1),
(2), (4) Date: Aug. 10, 2007

(87) PCT Pub. No.: WO2006/088931
PCT Pub. Date: Aug. 24, 2006

(65) Prior Publication Data
US 2010/0290751 A1 Nov. 18, 2010

(30) Foreign Application Priority Data
Feb. 16, 2005 (EP) .................................... 05003249

(51) Int. Cl.
*G02B 6/00* (2006.01)
(52) U.S. Cl. ...................................................... 385/135
(58) Field of Classification Search .................... 385/135
See application file for complete search history.

(56) References Cited

U.S. PATENT DOCUMENTS

| | | | |
|---|---|---|---|
| 4,824,196 A | 4/1989 | Bylander | |
| 5,093,885 A | 3/1992 | Anton | |
| 5,100,221 A * | 3/1992 | Carney et al. | 385/135 |
| 5,548,678 A | 8/1996 | Frost et al. | |
| 5,550,947 A | 8/1996 | Llewellyn et al. | |
| 5,740,299 A | 4/1998 | Llewellyn et al. | |
| 5,751,882 A | 5/1998 | Daems et al. | |
| 6,097,872 A | 8/2000 | Kusuda et al. | |
| 6,282,360 B1 | 8/2001 | Milanowski et al. | |
| 6,504,988 B1 | 1/2003 | Trebesch et al. | |

FOREIGN PATENT DOCUMENTS

| | | |
|---|---|---|
| EP | 538164 | 4/1993 |
| JP | 2002-236219 | 8/2002 |
| WO | 95/07481 | 3/1995 |
| WO | 2004/034116 A1 | 4/2004 |
| WO | 2004/034117 A2 | 4/2004 |

* cited by examiner

*Primary Examiner* — Uyen-Chau N Le
*Assistant Examiner* — Hoang Tran
(74) *Attorney, Agent, or Firm* — Gregg H. Rosenblatt

(57) ABSTRACT

A modular cable head (1) for use with a distributor in the field of optical telecommunications comprises a mounting frame (10) in which a plurality of plates (20) are pivotally mounted. The plates comprise an excess cable portion (21) for storage of excess fiber-optic cable length and a holding portion (22) for removably receiving and securely holding optical modules (30).

6 Claims, 4 Drawing Sheets

MODULAR CABLE HEAD FOR OPTICAL NETWORKS

CROSS REFERENCE TO RELATED APPLICATIONS

This application is a national stage filing under 35 U.S.C. 371 of PCT/US2006/005282, filed Feb. 15, 2006, which claims priority to European Application No. 05003249.9, filed Feb. 16, 2005, the disclosure of which is incorporated by reference in its/their entirety herein.

TECHNICAL FIELD

The invention relates to a modular cable head for use in distributors in optical telecommunications networks.

BACKGROUND

In the field of telecommunications, conventional copper wires are being largely replaced by transmission lines employing optical fibres. It is necessary in this case, in which optical rather than electrical signals are transmitted, to provide a distribution and organizing facility for the fibre-optic cables at appropriate locations within exchanges inside telecommunication companies, office buildings or in curb side facilities. These so-called distribution frames or distributors group together a plurality of termination or access points on the optical network, which allow the connection of devices or customers to various services provided on the network, as well as between them. A typical distributor consists of several cable heads, which are structures for actually mounting optical connection modules, optical devices and which also contain means for cable handling such as individualisers.

In this respect, and due to the sheer number of connections, it is useful, if the connection of new customers or devices or the modification of existing connections is possible without disturbing the other existing connections provided in the cable head. To that end, cable heads are generally built in a modular way, comprising a plurality of optical connection modules and also optical devices.

Each optical connection module serves the purpose of connecting optical fibres of a main cable (the so-called network cable) and/or of distribution cables (station cables) to cables running to the customer or optical device, or they may also serve for interconnecting optical fibres of distribution cables. Often, the modules also contain storage space for spare length of optical fibre in order to be able to cut (cleave) and reconnect connections between optical fibres at a later stage. It is necessary to provide such spare lengths because on one hand fibre length is lost during the cleaving process, and on the other hand the new cable end to be connected may be positioned at a greater distance from where the original connection took place.

Optical devices, on the other hand, perform functions within the network such as splitting (passive optical device) or amplification (active optical device). The cable head thus generally comprises a housing and cassettes supported by the housing for stowing optical fibres and fibre splices, or optical devices.

Optical modules of the mentioned type are, for example disclosed in U.S. Pat. No. 5,093,885. These comprise a housing, a connector panel and splicing trays inserted behind the connector panel into the housing. The connector panel is pivotally mounted on the housing, and can be opened to allow access to the rear of the connectors as well as to the splicing trays. Upon installation, the network or station cable is passed into the housing, is individualised and fixed to the splicing trays, where they are spliced to intermediate fibres leading to the connector panel. Cables from customers or optical devices are then connected to the connector panel by suitable connectors, such as pigtails.

EP 0 538 164 discloses, for example, a distribution head for fibre-optic cables, which employs a modular system for housing optical connection modules. It comprises a plurality of splicing organizers and a connection support plate fixed in separate places but in proximity to each other on the same drawer-like support, which is mounted in a pivoting way on the distribution head housing. Thereby it is possible to pivotally rotate the support out of the housing into an open position and perform installation and maintenance tasks. The splicing organizers can themselves be opened individually and receive partly individualized fibre-optic cables from the main network, which are spliced within them to intermediate fibres leading out to the connection support plate, where fibre-optic cables from devices or customers are attached via connectors, for example pigtails, to the intermediate fibres.

While this arrangement allows to some extent for individual handling of connections without disturbing other existing ones, the necessity to pivot the whole support carrying several splicing organizers and the connection support plate makes it unsuitable for locations where space is restricted. Also, in order to access an individual fibre or connection, it is necessary to move all optical fibres mounted in the cable head, and displace one or more splicing organizers, installation or maintenance work thereby being more time-consuming and error-prone.

A more space efficient solution is provided by U.S. Pat. No. 5,740,299 in which instead of having splicing organizers and connectors pivoted out together on a single support base, individual cassettes are pivotally supported by routing members, which in turn are connected together to form an aligned stack-like assembly. The incoming and outgoing network or station cables, or cables from optical devices are fed through the routing members to the individual cassettes, in which their optical fibres are spliced together and any excess length is stored.

In this case the cassettes do not provide connectors such as pigtails, rather connections have to be made by splicing within each pivotable cassette, and both incoming and outgoing fibres enter the cassette via the same passages in the routing member and via an attached flexible conduit necessary to protect the fibres against damage by excessive bending. This means that due to the space saving nature of the assembly both establishing and modifying connections from the network or station to customers or devices, or between the latter, requires considerable time and effort, and has to be performed in relatively little space.

SUMMARY OF THE INVENTION

The invention described in the following provides an improved modular cable head for use with distributors in optical telecommunications networks, which achieves greater flexibility, ease-of-use and economy of time associated with the installation, handling and maintenance of fibre-optic connections within the modules and/or devices of the cable head. This is accomplished firstly by the modular concept of the head, which allows equipment of the head optical module by optical module according to the need for connection of the equipment or of the customers, and secondly by providing removable modules, so that installing optical fibre module by module can be performed efficiently and independently without disturbing the other modules and their connections.

The modular cable head can be provided at any type of distributor in the field of optical telecommunications, for example a main distribution frame located in the central office of the telecommunications company, any type of intermediate distribution frame, an outside distribution point such as a cabinet located at the curb side or a distribution point provided in a building, such as an office building or on a particular floor of an office building.

The modular cable head according to the present invention has a generally open, frame-like structure and comprises a mounting structure for receiving a plurality of optical telecommunications modules. The mounting structure can also be called mounting frame, and is intended to cover any structure or assembly, which allows optical telecommunications modules to be mounted thereon. A portion of the mounting frame serves as a routing portion for routing fibre-optic cables to and from the optical telecommunications modules. As such, the routing portion may be formed integrally with the mounting frame or as a separate structure provided on the mounting frame. The shape of the routing portion is adapted to hold a plurality of fibre-optic cables so as to respect their minimum bend radius and to guide them from the network or station cable access point, such as a spreader subassembly, to the optical telecommunications modules in the mounting frame and vice versa. Thus the routing portion may be plate-like and comprise holders or means for appropriately holding fibre-optic cables such as cable brackets, hooks or other suitable protrusions known in the art. Additionally, suitable conduits or guiding means may be provided in the routing portion to guide the cables or groups of cables.

The mounting structure comprises a plurality of plates, which are each pivotally supported on the mounting structure so as to provide individual access to the plates by rotating them from their closed position to one of a range of possible open positions. A closed position here means a position in which a plate is located to some extent within the mounting structure for stowing and operating optical telecommunications elements, fibre-optic cables and/or devices, and an open position is understood to be a position in which an individual plate allows unhindered access thereto, for example for installation or intervention. In this context, a plate is a thin sheet-like element with two main surfaces on which optical telecommunications modules, fibre-optic cables and/or devices may be mounted. It is understood that, within the definition used in the present application, a plate may have recesses, openings or protrusions out of the plane of the plate needed for constructional or other functional purposes.

The pivoting axis is preferably arranged at an extremity of the plate close to an accessible portion of the mounting frame, so that the plate, when pivoted into an open position, gives easy access to the holding and excess cable portions. The pivotal axis of each plate is meant to be given by any suitable means, such as hinges, a pin fixed by screws, for example a gudgeon pin, pivoting arms or equivalent assemblies. Thereby, individual access to each plate is ensured without the need to alter the state of the remaining plates, or any other part of the mounting frame. The angle of rotation of the pivotally supported plates is preferably below 90° to minimize movement of the optical fibres, but may be 90° or greater if desired.

Each plate comprises a holding portion adapted to removably receive and securely hold at least one optical telecommunication module. Here, removably is intended to indicate that an optical telecommunication module can be completely detached from the plate, so as to be spatially separately accessible for user intervention, and be inserted into the holding portion and securely held there by suitable retaining means once work on the optical telecommunications module is completed. This provides enhanced versatility in the installation and maintenance process as fibre-optic cables can be handled and connected inside an optical telecommunication module in a location best suited to perform such work, such as on a nearby bench or in an engineer's test equipment, rather than being constrained to work within the spatially restricted environment of the mounting frame.

Advantageously, the plates comprise an excess cable portion provided with holders or means to hold the excess length of fibre-optic cable. Therefore, the provision of an excess cable portion on each plate, in addition to the excess cable storage provided by the optical modules, provides for enhanced versatility in arranging and planning connections between optical fibres. The holders of the fibre-optic cable may comprise known means such as cable brackets or the like arranged in a way so as to respect the minimum bend radius of the fibre-optic cables to be stored. Advantageously, they are also arranged so as to allow for plural entry or exit points for the fibre-optic cables to the excess cable portion, for example toward the holding portion of the optical connection module or toward the routing member.

Preferably, it is considered to position the holding portion substantially at the far end of the plates with respect to the pivot axis thereof, while the excess cable portion may be located substantially in proximity of said pivot axis. Although this arrangement has been found to be the most practical, other arrangements, such as one where the holding portion is substantially in proximity of the pivot axis on the plate, and the excess cable portion is substantially at the far end of the plate, are possible. Also, arrangements in which the holding portion and the excess cable portion are substantially at the same distance from the pivot axis on the plate may be contemplated.

Although, in line with the above, the plates of the modular cable head can have any suitable shape in order to provide the above-mentioned advantages, it is preferable that they are substantially L-shaped, with the pivot axis passing perpendicularly to the plane of the "L" through an extremity of one leg thereof, and said holding portion being located on the other leg thereof. It is understood that the exact shape may deviate from that of an "L" by the necessities of cable routing or structural support, so that certain portions of the plate may be recessed, perforated or protruded according to the particular needs of the application.

The plate may preferably be adapted to guide the fibre-optic cables coming out of one of said plurality of optical telecommunication modules in close proximity of the pivoting axis of said plate and have said fibre-optic cables observe a predetermined minimum bend radius while being held by holding means on said plate. The advantage of such an arrangement is that upon rotation of the plate out of or into its closed position, the fibre-optic cables are subjected only to minimum tensile stress, and their bending radius can be more easily controlled and kept above the minimum value. The mentioned holders are preferably cable brackets, but other means like hooks or guides are suitable.

As mentioned above, the optical modules serve to establish connections between different signal-transmitting optical fibres on the network, and the connections established within each optical module need to be made accessible to the outside of the module. Therefore, each optical module comprises a plurality of connectors, for example 12 so-called pigtails, which serve for connecting ends of fibre-optic cables, and may comprise at least one entry point for fibre-optic cables to enter the inside of the module. The connectors thus may be used to attach customers or devices to the optical module, while an entry point may serve for a network or station cable to be led to the splicing arrangement or other means for splicing within the module, which connect it internally to the connectors.

Within the optical module, the connectors are each provided with a length of optical fibre, which leads to splicing arrangements in the optical module. To store said length of optical fibre of each module, the optical modules preferably comprise an excess cable storage portion for storing excess cable length, and a tray adapted to provide optical fibre splices. This tray itself may take up a certain amount of stored fibre in addition to the fibre splices. In this respect it is advantageous if the tray is pivotally supported in the optical module or removable so as to enable easy access to the excess cable storage portion, as well as facilitating installation by separating main storage space from the splicing space.

Although the preceding discussion was centred on a modular cable head having plates for receiving and holding optical modules, it is also contemplated to provide plates adapted to receive at least one optical device. Here, optical devices may comprise passive optical devices such as splitters, or active optical devices such as amplifiers. The described arrangement of the plates facilitates the connection of such devices and allows for their easy inclusion in a modular cable head according to requirements.

As will be apparent from the above, a distributor for optical networks can be provided with enhanced versatility and ease-of-use by utilizing at least one modular cable head in one of the above-described feature combinations and at least one optical telecommunication module in order to allow the flexible connection of optical fibres providing telecommunications and data services to and between customers and devices on the network.

BRIEF DESCRIPTION OF THE DRAWINGS

In the following, the invention will be described by a non-limiting example thereof with reference to the following drawings, in which.

DESCRIPTION OF A PREFERRED EMBODIMENT OF THE INVENTION

Figure 1:
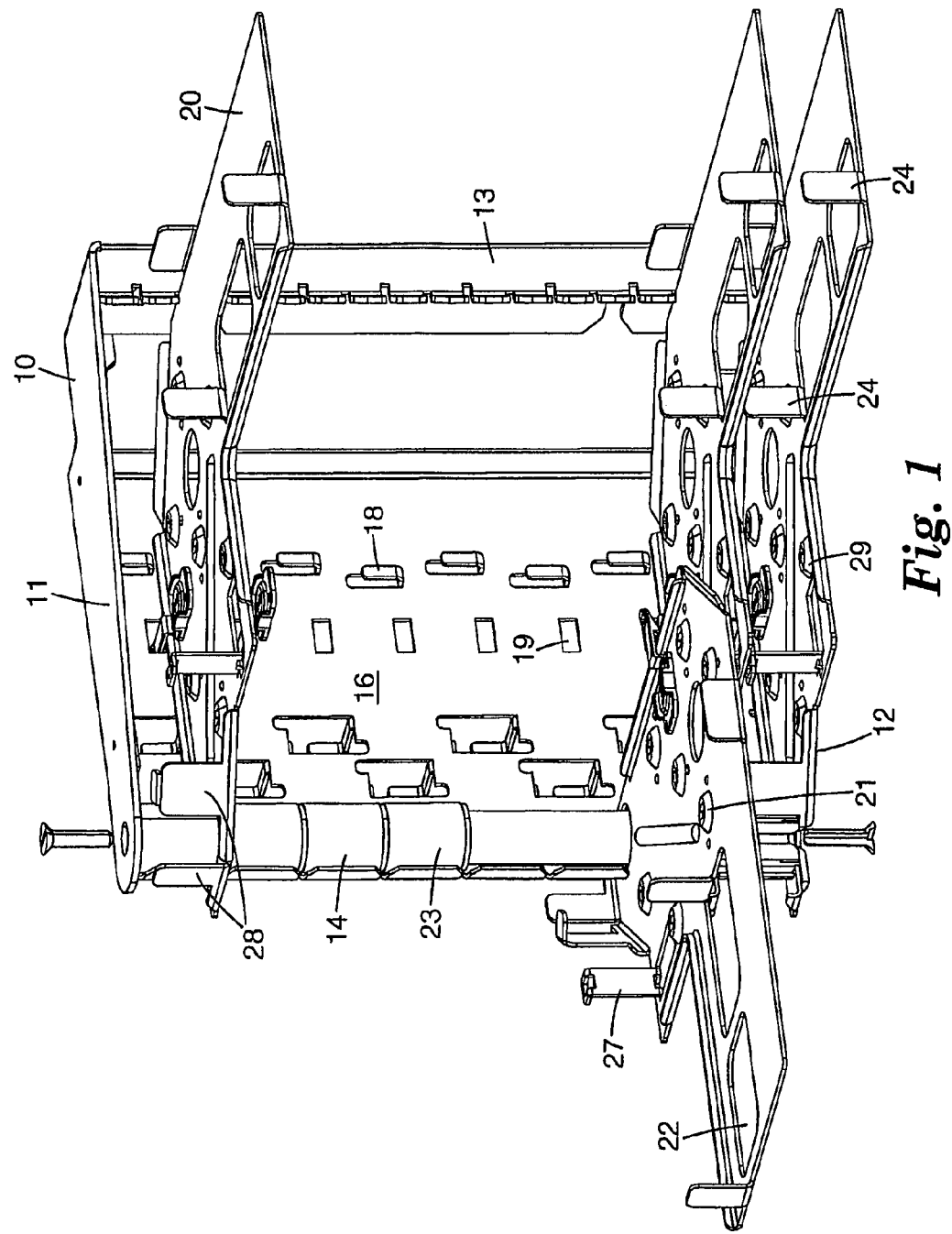
FIG. 1 shows a perspective view of the modular cable head according to the embodiment of the present invention, with all optical modules disassembled.
Figure 2:
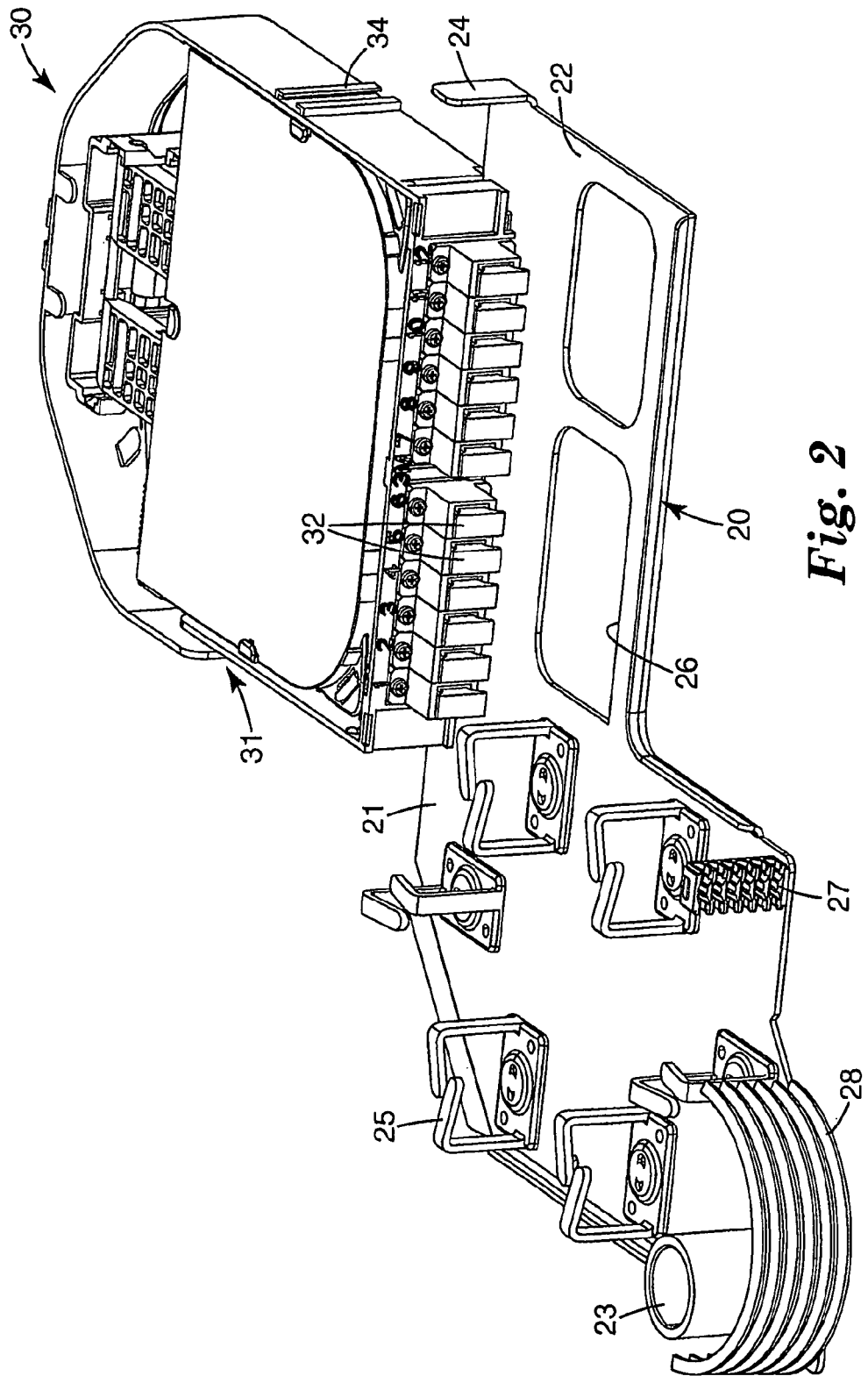
FIG. 2 shows a perspective view of a plate of the modular cable head according to the embodiment of the present invention, in which an optical telecommunication module (in the following termed just optical module) is being inserted.

In the embodiment of the present invention, described now with reference to FIGS. 1 and 2, the modular cable head 1 generally comprises a mounting frame 10 and plates 20 mounted therein as described below. The mounting frame is made up of top and bottom support surfaces 11, 12 having an elongated shape and being connected at their ends by lateral support bars 13, 14, and of a lateral wall constituting the routing portion 16. One bar 13 is attached in any suitable way (for example crimped, screwed or welded) to the support surfaces and is provided with protrusions or flanges (not shown), so that the entire modular cable head 1 can be mounted and attached to corresponding grooves on a distribution frame (not shown). The other bar 14, for example a gudgeon pin, has a cylindrical shape and is fixed to the support surfaces by screws 15.

The routing portion 16 extends between the support surfaces 13, 14 and is connected to their long edges by means of welding, crimping or other suitable means. Thus, the mounting frame defines a relatively open, shallow box-like structure, delimited by the surfaces 13, 14 and 16 and the lateral bars 13 and 14, in which the plates 20 are at least partially received when in their closed position, as will be described in the following. All or any combination of the just-described mounting frame may be integrally formed instead.

Each plate 20 is made of a sheet of material, such as a suitable metal or plastic, and is substantially L-shaped. On the extremity of one leg of each plate, a cylindrical tube 23 is attached, and serves as hinge around which the plate 20 is pivotally rotated in and out of the mounting frame 1 (in a plane perpendicular to the plane of FIG. 1). Therefore, the cylindrical bar 14 passes through the bore of the cylindrical tube 23, so that the plate 20 can rotate around the axis defined by said cylindrical bar 14. The diameters of the bore and the cylindrical bar 14 are such as to permit easy and wiggle-free rotation of the plate 20. The plates 20 are mounted on the bar 14 in a stacked manner, spaced apart by the distance given by the length of the cylindrical tube 23, so that a typical modular cable head 1 may comprise for example eight plates 20, vertically arranged, and rotatable in a horizontal plane, for mounting eight optical modules 30, or more, if a plate 20 is configured to receive more than one optical module 30. The vertical arrangement of the plates is not to be interpreted in a limiting way, and it is imaginable that the mounting frame is mounted with its lateral support bar 13 horizontally, so that the plates are sequentially arranged in a horizontal direction and pivoted in a vertical plane.

Owing to the L-shape of the plate, only one leg portion 21 is received within the mounting frame 10 and comes to lie adjacent to the routing portion 16, when the plate is rotated into the closed position, while the other leg portion 22 extends perpendicularly away from the plane of the routing portion 16 of the mounting frame 10. In view of this, the leg portion 22 is defined as the holding portion, which receives the optical module 30 to be mounted thereon, and the other leg portion 21 is defined as the excess cable portion, which receives excess length of fibre-optic cables leading to the optical module 30. Thus, in a closed state, excess cable length is stowed away in the mounting frame 10.

The depth of the holding portion 22 (the width of the leg of the "L", in a direction parallel to the other leg) may be such that it contacts and supports only part of the optical module to be mounted thereon. Therefore, in order to securely hold the optical module, flanges 24 are formed on the holding portion 22, which securely engage with corresponding recesses 34 on the housing of the optical module 30 when it is inserted. On the other hand, the flanges 24 can be disengaged, for example by means of a screw driver, to release the optical module 30 from the plate 20 in order to perform installation or maintenance work thereon. Openings 26 in the holding portion 22 of the plate 20 may be formed so as to provide access to the optical module 30 from below for testing purposes, without the need to open the module or remove it from the holding portion 22.

The excess cable portion 21 comprises holes 29 into which suitable holding means, such as cable brackets 25, are inserted in order to guide and store the excess cable length. Holes 29 and thus holding means 25 can be provided in any desired position on the plate that is suitable to guide the fibre-optic cables while respecting their minimum bend radius. For example, the holes can be arranged so that they hold and guide cables in loops or eights within the excess cable portion 21.

Having described in detail the structure of the modular cable head 1, the cable path through it will be briefly described, before the connection within the optical modules 30 is explained. Returning to the routing portion 16, it comprises hook-like protrusions 18 for holding and guiding incoming fibre-optic cables along its inner surface, as well as holes 19 for receiving holding means such as cable brackets (not shown) on its outer surface. These holes and cable brackets may be chosen to be identical to the holes 29 and cable brackets 25, respectively, in the excess cable portion 21. In this embodiment, the incoming cable received by the excess cable portion 21 comes, for example, from a network spreader subassembly (not shown), and is guided by the hooks 18 on the inside of the routing portion 16 towards the cylindrical bar 14 (the pivoting axis), from where in turn it is guided to the holding means 25 of excess cable portion 21. As described above, the incoming cable is stored in the excess cable portion 21 in loops and/or eights. From there it is directed towards an entry point 31 on the side of optical module 30. Because the incoming network cable passes close to the pivoting axis of the plate, only little movement and essentially no tensile stress is applied to the cable.

On the other hand, outgoing cables coming from the connectors 32 on the front side of optical module 30 are fixed to the plate by clamp 27, so that no movement of the cables or tensile stress due to rotation is transmitted to the optical connectors 32 of the optical module 30. From the clamp, the outgoing cables proceed toward the routing portion 16 and, additionally, each plate 20 comprises flanges 28, which serve to securely guide the outgoing fibre-optic cables in the space between them and the cylindrical tube 23 around the pivoting axis, so that they cannot get pushed away from the plate 20 when they are moved upon rotation of the plate. This further limits movement or tensile stress from being transmitted onto the connectors 32 of the optical module 30. As the cables are led around the pivoting axis and leave the plate 20, they are received on the outside of the routing portion 16 by the holders such as cable brackets inserted into holes 19. From there the outgoing cables are led to customers or other devices.

Figure 3A:
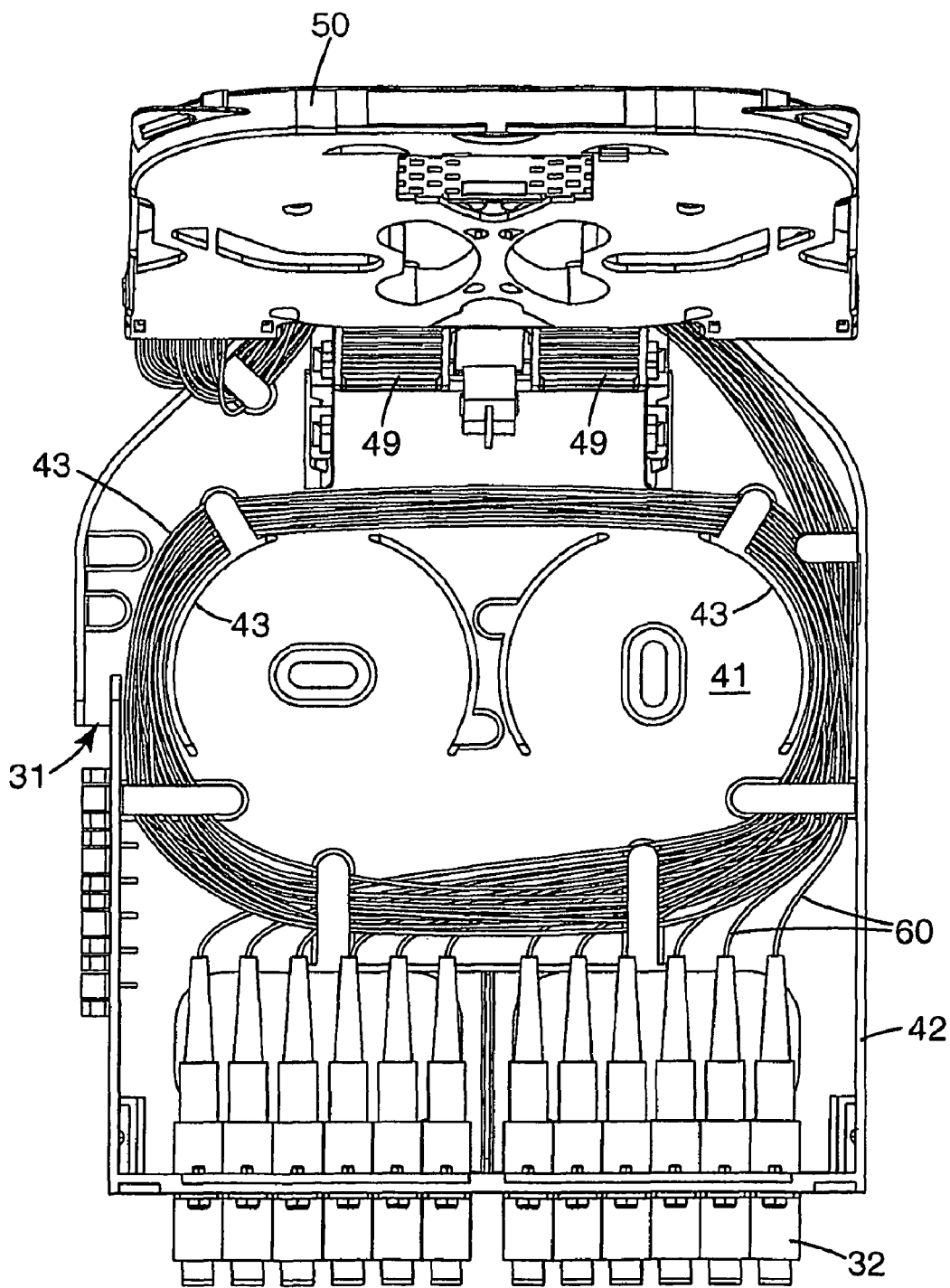
FIG. 3 shows a top view of an optical module according to the embodiment of the invention, with a) the tray opened, and b) the tray closed.
Figure 3B:
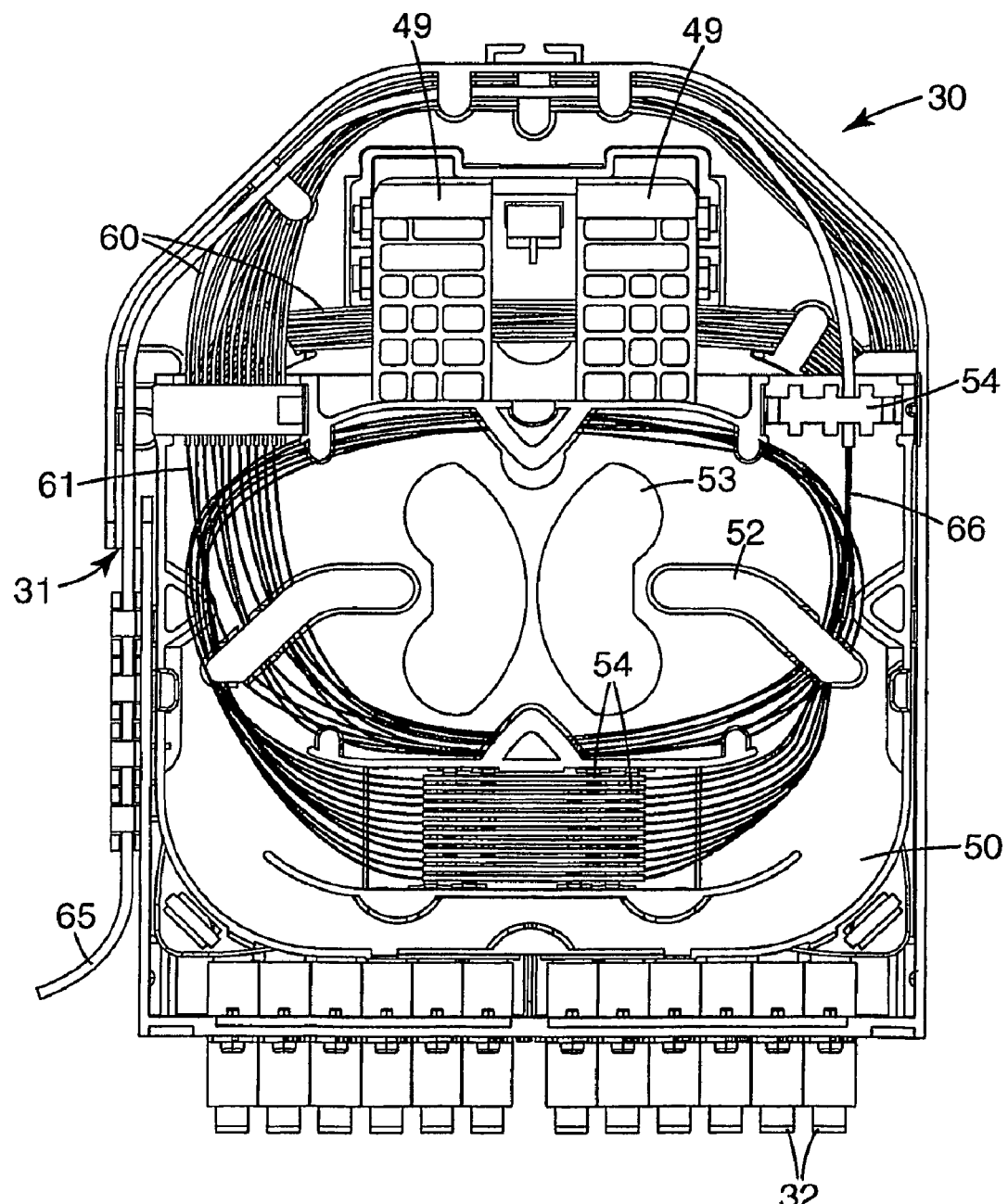

In the following, the arrangement of optical fibres and their connection within an optical module will briefly be described with reference to FIGS. 3a and 3b. The optical module 30 has a substantially cassette-like shape and may be, as in this embodiment, of substantially rectangular shape with two rounded edges. It comprises a base plate 41 surrounded on three sides by an outer wall 42. On the fourth side a front wall has the connectors 32 mounted thereon. The outer wall 42 leaves at least one opening on one side serving as the entry point 31 for the incoming network cable 65. On the inner side of the front wall, intermediate optical fibres 60 are attached to the connectors and are stored on the base plate by being wound around arc-shaped guiding members 43. On the back wall of the optical module a tray 50 is attached through hinges 49, so that it can be pivotally opened or closed onto the base plate 41 with its stored length of intermediate optical fibres 60. Once the intermediate optical fibres 60 are wound and stored, their ends opposite to the connector ends are led to the rear of the optical module, and as can be seen in FIG. 3b, are fixed by clamp 51 on top of tray 50, which is lowered into a closed position covering the base plate and the stored fibres 60. The incoming network cable 65 enters the optical module 30 at the entry point 31, and is fixed to the tray 50 by clamp 54. After clamps 51 and 54 the sheaths of the optical fibres of the intermediate fibres 60 and the network cable 65 are removed, and the bare fibres 61 and 66 are wound around guide member 53 and led to the splicing arrangement 54. In the splicing arrangement 54, the ends of the bare intermediate fibres 61 are spliced together with the ends of the bare network fibres 66, and an optical connection between them is established. The splicing may be performed by any means known in the art, such as fusion splicing or epoxy splicing.

It is understood that, in the modular cable head 1 according to the invention just described, an optical device may be mounted in place of an optical module 30 in the above-mentioned plates 20. Consequently, the position of connectors and cable routing may differ from the above without, however, departing from the spirit of the present invention.

Finally, regarding the materials used, the mounting frame 10, routing portion 16 and the plates 20 can be made of metal. The plates 20, in particular, can be made of sheet metal, but also of a suitably rigid plastic. The bars 13 and 14 may be made of extruded metal such as aluminium. The connectors, holding means, and the housing and interior of the optical module (base plate 41, walls 42, tray 50) may be made of plastic.

The present invention has now been described with reference to an embodiment thereof. The foregoing detailed description and embodiment have been given for clarity of understanding only. No unnecessary limitations are to be understood therefrom. For example, all references to right, left, front and rear are exemplary only and do not limit the claimed invention. It will be apparent to those skilled in the art that many changes can be made to the embodiment described without departing from the scope of the invention. Thus, the scope of the present invention should not be limited to the exact details and structures described herein, but rather by the structures described by the language of the claims, and the equivalents of those structures.

The invention claimed is:

1. Modular cable head comprising
a mounting frame for receiving a plurality of optical telecommunication modules having a routing portion for routing fibre-optic cables to and from the telecommunication modules, wherein
the mounting frame comprises a plurality of plates, which are each pivotally supported for providing individual access to said plates, each plate having a holding portion adapted to removably receive and hold at least one of said plurality of optical telecommunication modules, wherein said plates comprise an excess cable portion provided with holding means to hold excess length of fibre-optic cable, and wherein each plate is substantially L-shaped, with the pivot axis passing perpendicularly to the plane of the "L" through an extremity of one leg, said excess cable portion being located on the one leg and said holding portion being located on the other leg.

2. Modular cable head according to claim 1, wherein said holding portion is substantially at the far end of said plates with respect to the pivot axis thereof.

3. Modular cable head according to claim 1, wherein fibre-optic cables coming out of one of said plurality of optical telecommunication modules pass in close proximity of the pivoting axis of said plate and observe a predetermined minimum bend radius of said fibre-optic cables while being held by holding means on said plate.

4. Modular cable head according to claim 1, wherein said optical modules comprise a plurality of connectors (pigtails) for connecting ends of fibre-optic cables and at least one entry point for fibre-optic cables.

5. Modular cable head according to claim 1, wherein said optical modules comprise an excess cable storage portion for storing excess cable length, and a tray adapted to provide optical fibre splices.

6. Modular cable head according to claim 1, wherein said holding portion of at least one of said plates is adapted to removably receive and hold at least one optical device.

* * * * *